(12) United States Patent
Cox et al.

(10) Patent No.: US 8,392,340 B2
(45) Date of Patent: Mar. 5, 2013

(54) METHOD AND APPARATUS FOR DETECTING CONDITIONS OF A PERIPHERAL DEVICE INCLUDING MOTION, AND DETERMINING/PREDICTING TEMPERATURE(S) WHEREIN AT LEAST ONE TEMPERATURE IS WEIGHTED BASED ON DETECTED CONDITIONS

(75) Inventors: Keith Cox, Campbell, CA (US); Gaurav Kapoor, Santa Clara, CA (US); Michael Culbert, Monte Sereno, CA (US)

(73) Assignee: Apple Inc., Cupertino, CA (US)

( * ) Notice: Subject to any disclaimer, the term of this patent is extended or adjusted under 35 U.S.C. 154(b) by 748 days.

(21) Appl. No.: 12/564,025

(22) Filed: Sep. 21, 2009

(65) Prior Publication Data

US 2010/0235012 A1    Sep. 16, 2010

Related U.S. Application Data

(60) Provisional application No. 61/160,268, filed on Mar. 13, 2009.

(51) Int. Cl.
*G06F 15/18* (2006.01)
(52) U.S. Cl. .......................................... 706/12
(58) Field of Classification Search ............. 706/12, 706/62
See application file for complete search history.

(56) References Cited

U.S. PATENT DOCUMENTS

| | | | |
|---|---|---|---|
| 3,509,298 A | 4/1970 | Kirk | |
| 3,706,867 A | 12/1972 | Rand et al. | |
| 3,721,956 A | 3/1973 | Hamann et al. | |
| 3,790,727 A | 2/1974 | Laserson et al. | |
| 4,311,891 A | 1/1982 | Faust | |
| 4,513,183 A | 4/1985 | Hill | |
| 4,628,160 A | 12/1986 | Canevari | |
| 4,833,281 A | 5/1989 | Maples | |
| 4,862,302 A | 8/1989 | Ekhoff | |
| 5,227,929 A | 7/1993 | Comerford | |
| 5,434,371 A | 7/1995 | Brooks | |
| RE35,269 E | 6/1996 | Comerford | |
| 5,559,396 A | 9/1996 | Bruning et al. | |

(Continued)

FOREIGN PATENT DOCUMENTS

| | | |
|---|---|---|
| EP | 0658894 A1 | 6/1995 |
| GB | 2378878 A1 | 2/2003 |

(Continued)

OTHER PUBLICATIONS

Microsoft Press Computer Dictionary, 1994, p. 298.*

(Continued)

*Primary Examiner* — David Vincent
(74) *Attorney, Agent, or Firm* — Blakely, Sokoloff, Taylor & Zafman LLP

(57) ABSTRACT

Methods and apparatuses to automatically adjust a thermal requirement of a data processing system are described. One or more conditions associated with a data processing system are detected. A temperature requirement for the data processing system is determined based on the one or more conditions. The performance of the data processing system may be throttled to maintain a temperature of the data processing system below the temperature requirement. Detecting the one or more conditions associated with the data processing system may include determining a location of the data processing system based on a measured motion, a state of a peripheral device, a position of one portion of the data processing system (e.g., a lid) relative another portion of the data processing system (e.g., a bottom portion), a type of application operating on the data processing system, or any combination thereof.

26 Claims, 16 Drawing Sheets

U.S. PATENT DOCUMENTS

| | | |
|---|---|---|
| 5,789,716 A | 8/1998 | Wang |
| 5,824,904 A | 10/1998 | Kouhei et al. |
| 5,955,712 A | 9/1999 | Zakutin |
| 5,982,573 A | 11/1999 | Henze |
| 6,002,963 A | 12/1999 | Mouchawar et al. |
| 6,028,275 A | 2/2000 | Jou |
| 6,044,299 A | 3/2000 | Nilsson |
| 6,046,877 A | 4/2000 | Kelsic |
| 6,104,878 A | 8/2000 | Toguchi et al. |
| 6,160,540 A | 12/2000 | Fishkin et al. |
| 6,185,485 B1 | 2/2001 | Ashrafi et al. |
| 6,199,874 B1 | 3/2001 | Galvin et al. |
| 6,243,074 B1 | 6/2001 | Fishkin et al. |
| 6,304,804 B1 | 10/2001 | DeBoni |
| 6,308,134 B1 | 10/2001 | Croyle et al. |
| 6,353,384 B1 | 3/2002 | Kramer |
| 6,369,706 B1 | 4/2002 | Anderson et al. |
| 6,393,892 B1 | 5/2002 | Ohbayashi et al. |
| 6,407,876 B1 | 6/2002 | Yamaguchi et al. |
| 6,428,449 B1 | 8/2002 | Apseloff |
| 6,448,516 B1 | 9/2002 | Chiang |
| 6,453,266 B1 | 9/2002 | Chainer et al. |
| 6,466,821 B1 | 10/2002 | Pianca et al. |
| 6,472,864 B1 | 10/2002 | Emo et al. |
| 6,520,013 B1 | 2/2003 | Wehrenberg |
| 6,545,235 B1 | 4/2003 | Chou |
| 6,545,661 B1 | 4/2003 | Goschy et al. |
| 6,556,185 B2 | 4/2003 | Rekimoto |
| 6,559,396 B1 | 5/2003 | Chou |
| 6,580,579 B1 | 6/2003 | Hsin et al. |
| 6,618,683 B1 | 9/2003 | Berstis et al. |
| 6,634,207 B1 | 10/2003 | Lottman et al. |
| 6,649,905 B2 | 11/2003 | Grenlund |
| 6,650,940 B1 | 11/2003 | Zhu et al. |
| 6,658,292 B2 | 12/2003 | Kroll et al. |
| 6,679,118 B1 | 1/2004 | Esashi et al. |
| 6,765,489 B1 | 7/2004 | Ketelhohn |
| 6,768,066 B2 | 7/2004 | Wehrenberg |
| 6,769,497 B2 | 8/2004 | Dubinsky et al. |
| 6,778,348 B1 | 8/2004 | Carley |
| 6,956,564 B1 | 10/2005 | Williams |
| 6,977,675 B2 | 12/2005 | Kotzin |
| 7,176,396 B1 | 2/2007 | Chou |
| 7,351,925 B2 | 4/2008 | Wahrenberg |
| 7,456,823 B2 | 11/2008 | Poupyrev |
| 8,161,299 B2* | 4/2012 | Karkaria et al. .............. 713/300 |
| 2002/0021278 A1 | 2/2002 | Hinckley et al. |
| 2002/0190947 A1 | 12/2002 | Feinstein |
| 2003/0076343 A1 | 4/2003 | Fishkin et al. |
| 2003/0085870 A1 | 5/2003 | Hinckley |
| 2003/0103091 A1 | 6/2003 | Wong et al. |
| 2004/0027330 A1 | 2/2004 | Bradski |
| 2006/0017692 A1 | 1/2006 | Wehrenberg et al. |
| 2006/0139326 A1* | 6/2006 | Tsukamoto ................... 345/158 |
| 2006/0155424 A1* | 7/2006 | Katoh et al. .................. 700/300 |
| 2006/0193113 A1* | 8/2006 | Cohen et al. .................. 361/687 |
| 2008/0059004 A1* | 3/2008 | Katoh et al. .................. 700/300 |
| 2008/0253015 A1* | 10/2008 | Harrington .................... 360/75 |
| 2009/0182986 A1* | 7/2009 | Schwinn et al. .............. 712/214 |

FOREIGN PATENT DOCUMENTS

| | | |
|---|---|---|
| GB | 2379987 A1 | 3/2003 |
| WO | WO 01/86920 A2 | 11/2001 |
| WO | WO 01/86920 A3 | 11/2001 |
| WO | WO 03/001340 A2 | 1/2003 |
| WO | WO 03/076023 A1 | 9/2003 |

OTHER PUBLICATIONS

PCT International Preliminary Examination Report for International Application No. PCT/US01/30387, mailed Jan. 18, 2005, 7 pages.

PCT International Preliminary Report on Patentability for International Application No. PCT/US2005/003599, mailed Sep. 14, 2006, 13 pages.

PCT International Search Report and Written Opinion for International Application No. PCT/US2005/003599, mailed Mar. 3, 2006, 23 pages.

PCT International Search Report for International Application No. PCT/US01/30387, mailed Sep. 19, 2002, 8 pages.

PCT Invitation to Pay Additional Fees for International Application No. PCT/US01/30387, mailed May 27, 2002, 6 pages.

PCT Invitation to Pay Additional Fees for International Application No. PCT/US2005/003599, mailed Jan. 12, 2006, 8 pages.

PCT Written Opinion for International Application No. PCT/US01/30387, mailed May 27, 2004, 6 pages.

\* cited by examiner

METHOD AND APPARATUS FOR DETECTING CONDITIONS OF A PERIPHERAL DEVICE INCLUDING MOTION, AND DETERMINING/PREDICTING TEMPERATURE(S) WHEREIN AT LEAST ONE TEMPERATURE IS WEIGHTED BASED ON DETECTED CONDITIONS

CROSS REFERENCE TO RELATED APPLICATION

The present application claims the benefit of prior U.S. Provisional Patent Application No. 61/160,268, entitled "AUTOMATIC ADJUSTMENT OF THERMAL REQUIREMENT" filed on Mar. 13, 2009, which is hereby incorporated by reference.

FIELD OF THE INVENTION

At least some embodiments of the present invention relate generally to data processing systems, and more particularly but not exclusively to the management of power and/or thermal characteristics in data processing systems.

BACKGROUND

Traditionally, computer systems are designed to be able to continuously run a fairly worst-case power load. Design according to such a continuous worst-case power load has never been much of a problem, because traditionally the individual components have had modest operating powers and the computer systems have had large power budgets so that the systems could sustain the load fairly naturally.

As the operating power consumptions of the individual components of computer system creep upwards, the power budgets of the computer systems have become tighter. It is now becoming a challenge to design a computer system to keep its temperature below a critical temperature while pursuing various goals, such as high computing power, compactness, quietness, better battery performance, etc. The critical temperature can be defined as a temperature at or near a surface of the computer system, such as a bottom of a laptop computer or the bottom of a cellular telephone (e.g., a "smartphone").

Typically, for computer systems the value of a critical temperature threshold involves an important temperature-performance trade-off. Generally, a low critical temperature threshold provides the user with a better cooling experience, whereas a high critical temperature threshold provides better performance. Currently, a critical temperature threshold of the computer system cannot be adjusted. Typically, a critical temperature threshold is set at a computer manufacturing stage in the middle between the high critical temperature threshold and the low critical temperature threshold as a compromise between the cooling experience and the performance.

SUMMARY OF THE DESCRIPTION

Methods and apparatuses to automatically adjust a thermal requirement of a data processing system are described. One or more conditions associated with a data processing system are detected. A temperature requirement for the data processing system can be determined based on the one or more conditions. The performance of the data processing system can be throttled to maintain a temperature of the data processing system below the temperature requirement.

In at least some embodiments, detecting the one or more conditions associated with the data processing system may include determining a location of the data processing system based on a measured motion, a state of a peripheral device, determining a position of one portion of the data processing system (e.g., a lid) relative another portion of the data processing system (e.g., a bottom portion), a type of application operating on the data processing system, or any combination thereof. The thermal requirements for each of the one or more conditions may be predicted, and the predicted thermal requirements for each of the one or more conditions may be weighed to determine the temperature requirement of the data processing system.

In at least some embodiments, the temperature requirement of the data processing system includes selecting a temperature set point based on the detected one or more conditions of the data processing system.

In at least some embodiments, the data processing system that automatically adjusts the thermal requirement includes a portable device.

In at least some embodiments, a motion of a data processing system is detected. A position of the data processing system may be determined based on the detected motion. A temperature set point for the data processing system may be adjusted based on the position of the data processing system. In at least some embodiments, adjusting the temperature set point includes selecting the temperature set point based on the detected position of the data processing system. The performance of the data processing system may be throttled to maintain the data processing system temperature below the adjusted temperature requirement.

In at least some embodiments, detecting the motion associated with a data processing system includes measuring accelerations associated with the data processing system. The acceleration can be measured, in one embodiment, with an accelerometer, which is used to protect a hard disk drive from sudden accelerations.

In at least some embodiments, determining the position of the data processing system includes increasing a confidence for a first location of the data processing system if the motion is not detected within a first time interval; and increasing the confidence for a second location of the data processing system if the motion is detected within the first time interval.

In at least some embodiments, determining the position of the data processing system includes increasing a confidence for a first location if a rate of the motion is less than a rate threshold; and increasing the confidence for a second location of the data processing system if a rate of the motion is more than a rate threshold.

In at least some embodiments, determining the position of the data processing system includes increasing a confidence for a first location if a range of the motion is less than a range threshold; and increasing the confidence for a second location of the data processing system if a range of the motion is more than a range threshold.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
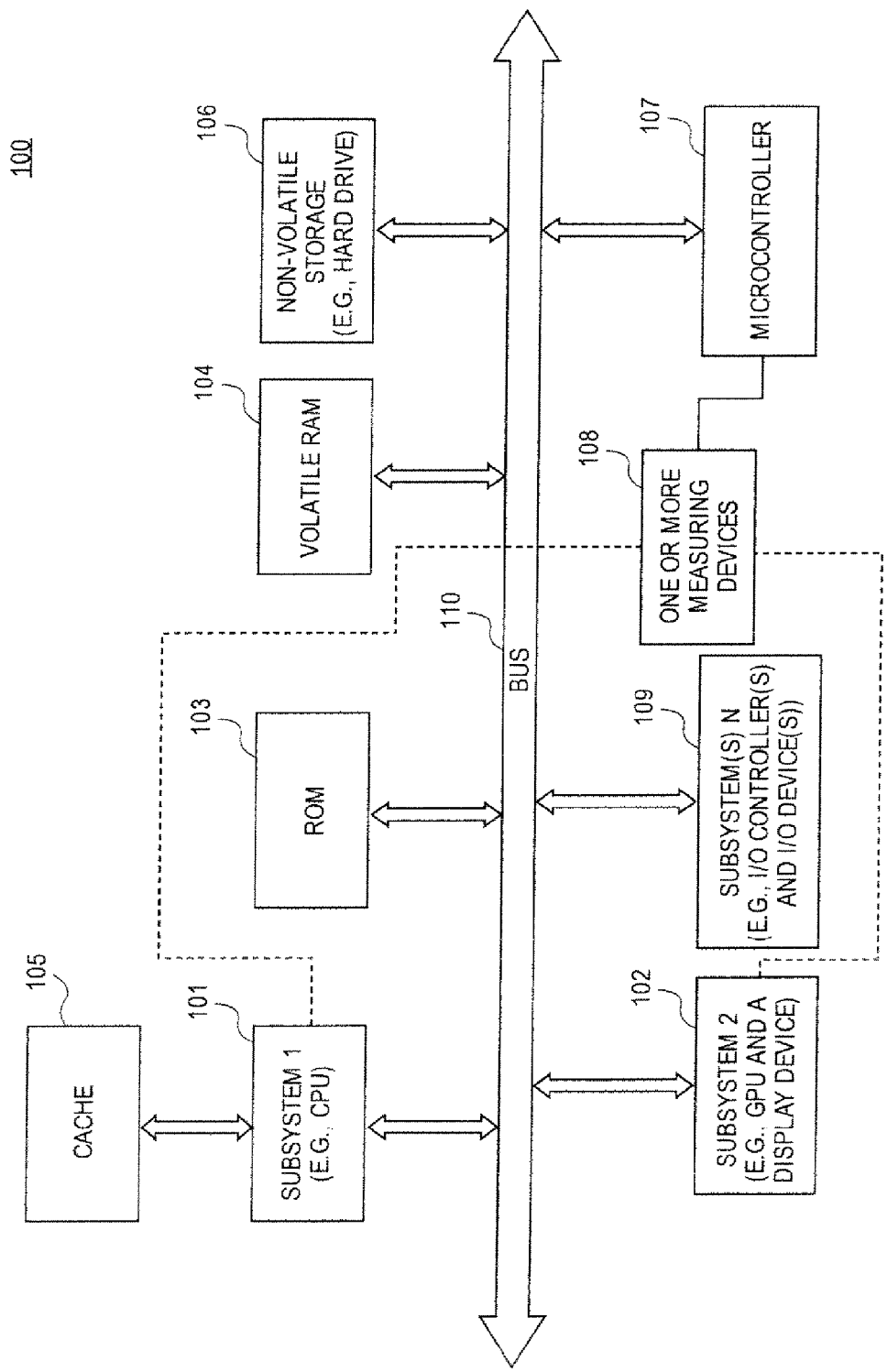
FIG. 1 illustrates one embodiment of a system to automatically adjust a thermal requirement.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily refer to the same embodiment.

Unless specifically stated otherwise, it is appreciated that throughout the description, discussions utilizing terms such as "processing" or "computing" or "calculating" or "determining" or "displaying" or the like, refer to the action and processes of a data processing system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention can relate to an apparatus for performing one or more of the operations described herein. This apparatus may be specially constructed for the required purposes, or it may comprise a general purpose computer selectively activated or reconfigured by a computer program stored in the computer. Such a computer program may be stored in a machine (e.g., computer) readable storage medium, such as, but is not limited to, any type of disk, including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions, and each coupled to a bus.

A machine readable medium can be used to store software and data which when executed by a data processing system causes the system to perform various methods of the present invention. This executable software and data may be stored in various places including for example ROM, volatile RAM, non-volatile memory, and/or cache. Portions of this software and/or data may be stored in any one of these storage devices.

Thus, a machine readable medium includes any mechanism that provides (i.e., stores and/or transmits) information in a form accessible by a machine (e.g., a computer, network device, cellular phone, personal digital assistant, manufacturing tool, any device with a set of one or more processors, etc.). For example, a machine readable medium includes recordable/non-recordable media (e.g., read only memory (ROM); random access memory (RAM); magnetic disk storage media; optical storage media; flash memory devices; and the like.

The algorithms and displays presented herein are not inherently related to any particular computer or other apparatus. Various general-purpose systems may be used with programs in accordance with the teachings herein, or it may prove convenient to construct more specialized apparatus to perform the required machine-implemented method operations. The required structure for a variety of these systems will appear from the description below.

In addition, embodiments of the present invention are not described with reference to any particular programming language. It will be appreciated that a variety of programming languages may be used to implement the teachings of embodiments of the invention as described herein.

Many of the methods of the present invention may be performed with a digital processing system, such as a conventional, general-purpose computer system. The computer systems may be, for example, entry-level Mac Mini™ and consumer-level iMac™ desktop models, the workstation-level Mac Pro™ tower, and the MacBook™, MacBook Pro™ laptop computers produced by Apple Inc., located in Cupertino, Calif. Small systems (e.g. very thin laptop computers, like MacBook Air™) can benefit from the methods described herein. Special purpose computers, which are designed or programmed to perform only one function, or consumer electronic devices, such as a cellular telephone, may also perform the methods described herein.

Methods and apparatuses to automatically adjust a thermal requirement of a data processing system are described herein. One or more conditions associated with a data processing system are detected at a current time. A temperature requirement for the data processing system can be predicted for a future time based on the detected one or more conditions. The thermal requirement (e.g., a temperature set point or a target temperature) of the data processing system can be adjusted to the predicted temperature requirement based on the detected one or more conditions. The one or more conditions associated with the data processing system may be, for example, a state of the data processing system, a location of the data processing system, a type of application and/or quantity of applications operating on the data processing system, as described in further detail below. For example, a temperature set point for the laptop computer may be decreased when it is detected that the laptop computer is at one location (e.g., on a user's lap), and the temperature set point may be increased when it is detected that the laptop computer is at a different location (e.g., on a desk). Further, the performance of the data processing system can be throttled to maintain a temperature of the data processing system below the adjusted temperature requirement. For example, the performance of a laptop computer may be throttled so that its external temperature remains below an adjusted critical threshold.

FIG. 1 illustrates one embodiment of a system to automatically adjust a thermal requirement. As shown in FIG. 1 system 100 includes a subsystem 101, e.g., a Central Processing Unit ("CPU"), a subsystem 102, e.g., a Graphics Processing Unit ("GPU") that may be coupled with a display device, and one or more subsystems 109, e.g., one or more Input/Output ("I/O") controllers coupled to one or more I/O devices, and a microcontroller 107 coupled to a bus 110. The subsystem 101 and/or subsystem 102 may include, for example, an Intel Pentium microprocessor, or Motorola Power PC microprocessor, such as a G3 or G4 microprocessors, or IBM microprocessor. The data processing system 100 may interface to external systems through a modem or network interface (not shown). It will be appreciated that the modem or network interface (not shown) can be considered to be part of the data processing system 100. This interface can be an analog modem, ISDN modem, cable modem, token ring interface, satellite transmission interface, or other interfaces for coupling a data processing system to other data processing systems.

Further, system 100 includes a volatile RAM 104, a non-volatile storage 106, e.g., a hard drive, Read-only memory ("ROM") 103, and a cache memory 105 coupled to subsystem 101 which is coupled to bus 110. Memory 104 can be dynamic random access memory (DRAM) and can also include static RAM (SRAM). Memory 104 may include one or more memory buffers. The non-volatile storage 106 is often a magnetic hard disk, an optical disk, or another form of storage for large amounts of data. Some of this data is often written, by a direct memory access process, into memory 104 during execution of software in the data processing system 100. One of skill in the art will immediately recognize that the terms "computer-readable medium" and "machine-readable medium" include any type of storage device that is accessible by the processor, such as a processor unit of subsystem 101.

The bus 110 couples the subsystem 101 to the memories 104 and 103 and also to non-volatile storage 106 and to subsystem 102 and to subsystem 109. The subsystem 102 may include a display controller (not shown) that controls in the conventional manner a display on a display device (not shown) which can be a cathode ray tube (CRT) or liquid crystal display (LCD). The subsystem 109 may include an I/O controller (not shown) coupled to one or more input/output devices (e.g., a keyboard, disk drives, printers, a scanner, speakers, microphone, camera, and other input and output devices, including a mouse or other pointing device). In one embodiment, the I/O controller of subsystem 109 includes a USB (Universal Serial Bus) adapter for controlling USB peripherals, and/or an IEEE-1394 bus adapter for controlling IEEE-1394 peripherals.

As shown in FIG. 1, one or more measuring devices 108 are coupled to subsystems 101, 102, 109, and to microcontroller 107, as shown in FIG. 1. The measuring devices 108 may be used to detect one or more conditions of the data processing system 100, as described in further detail below. In one embodiment, one or more tables containing thermal requirements and corresponding performance settings, as set forth in further detail below, are stored in any of memories 103, 104, and storage 106 or within a memory in a microcontroller 107. In one embodiment, microcontroller 107 performs methods to automatically adjust a thermal requirement for system 100 based on one or more conditions, as described in further detail below. In another embodiment, subsystem 101, rather than microcontroller 107, performs methods to automatically adjust a thermal requirement for system 100 based on one or more conditions, as described in further detail below.

It will be appreciated that the data processing system 100 is one example of many possible data processing systems which have different architectures. For example, personal computers based on an Intel microprocessor often have multiple buses, one of which can be an input/output (I/O) bus for the peripherals and one that directly connects the subsystem 101 and the memory 104 and/or memory 103 (often referred to as a memory bus). The buses are connected together through bridge components that perform any necessary translation due to differing bus protocols.

Network computers are another type of data processing system that can be used with the embodiments of the present invention. Network computers do not usually include a hard disk or other mass storage, and the executable programs are loaded from a network connection into the any of memories 103, 104, and/or storage 106 for execution by the processor, e.g., a processor of subsystem 101. A Web TV system, which is known in the art, is also considered to be a data processing system according to the embodiments of the present invention, but it may lack some of the features shown in FIG. 1, such as certain input or output devices. A typical data processing system will usually include at least a processor, memory, and a bus coupling the memory to the processor.

The methods to automatically adjust a temperature requirement of a data processing system, as set forth in further detail below can be implemented using dedicated hardware (e.g., using Field Programmable Gate Arrays, or Application Specific Integrated Circuit) or shared circuitry (e.g., microprocessors or microcontrollers under control of program instructions stored in a machine readable medium. The methods of the present invention can also be implemented as computer instructions for execution on a data processing system, such as system 100 of FIG. 1.

Figure 2:
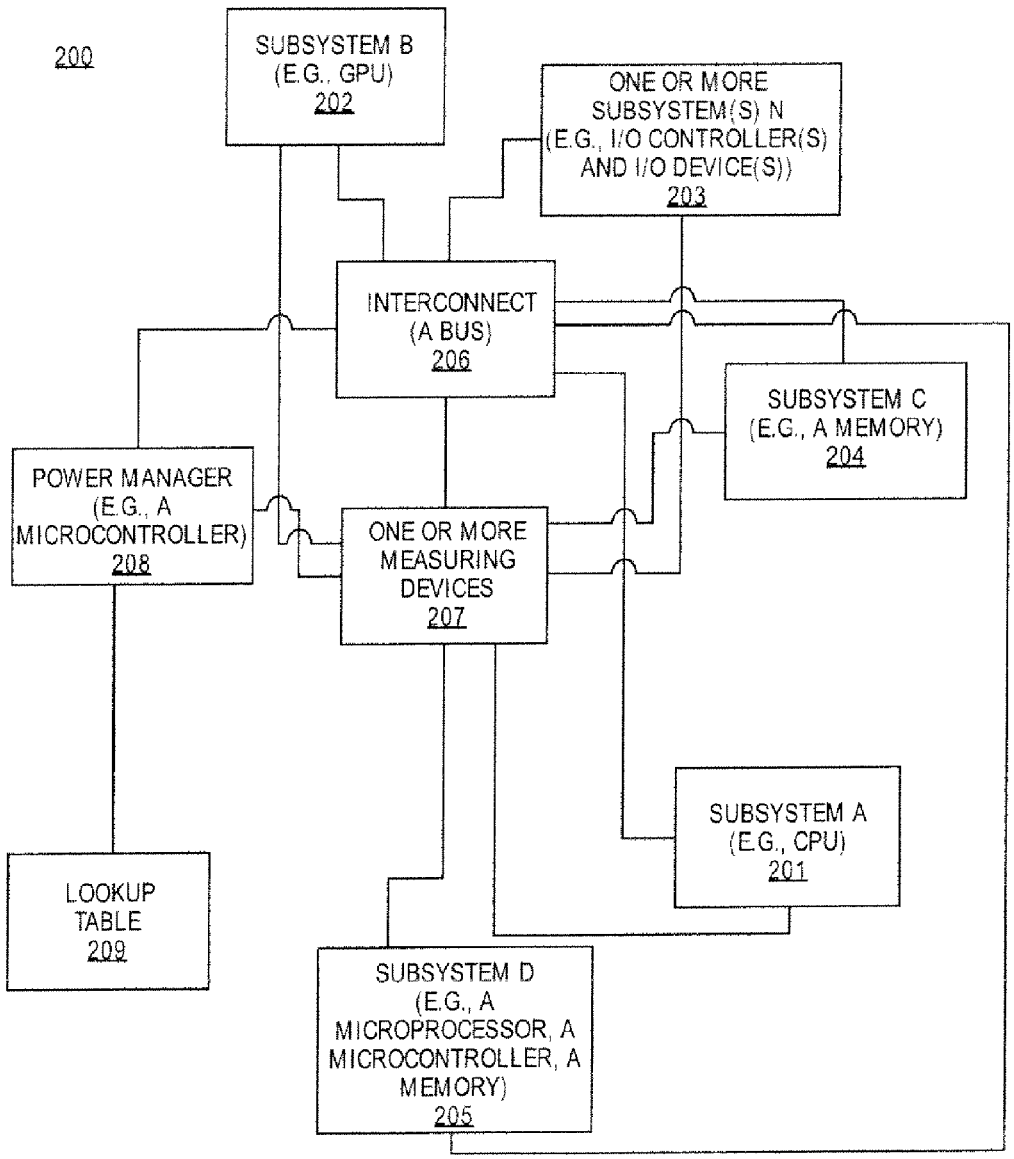
FIG. 2 illustrates another embodiment of a system to dynamically adjust thermal requirement based on one or more conditions.

FIG. 2 illustrates another embodiment of a system to dynamically adjust thermal requirement based on one or more conditions. As shown in FIG. 2 system 200 includes a subsystem A 201, e.g., a CPU, a subsystem B 202, e.g., a GPU that may be coupled with a display device, subsystem C 204, e.g., a memory, subsystem D 205, e.g., a microprocessor, and one or more subsystems N 203, e.g., one or more I/O controllers coupled to one or more I/O devices, a power manager 208, e.g., a microcontroller, a system management controller ("SMC"), coupled to a interconnect 206, e.g., a bus. Subsystem C 204 may be a volatile RAM, a non-volatile memory, e.g., a hard drive, and/or a ROM. One or more measuring devices 207, e.g., one or more sensors to detect one or more conditions associated with system 200 are coupled to subsystems 201-205, and to power manager 208, as shown in FIG. 2.

A thermal requirement look-up table 209 that may include performance settings (e.g, voltage, frequency), and conditions for the system 200, is coupled to power manager 208, as shown in FIG. 2. Components of the system 200, including processors, microcontrollers, buses, I/O controllers, I/O devices, memories, sensors are described above with respect to FIG. 1. In one embodiment, one or more thermal requirement lookup tables corresponding to various performance settings and conditions of the computer system may be generated by subsystem 201 (or generated by test equipment in the design and/or manufacturing process), and stored in memory 204, and/or in a memory located in power manager 208. In one embodiment, power manager 208 performs methods to dynamically adjust thermal requirement for the system. In another embodiment, subsystem 201 performs methods to dynamically adjust thermal requirement for the system.

Figure 3:
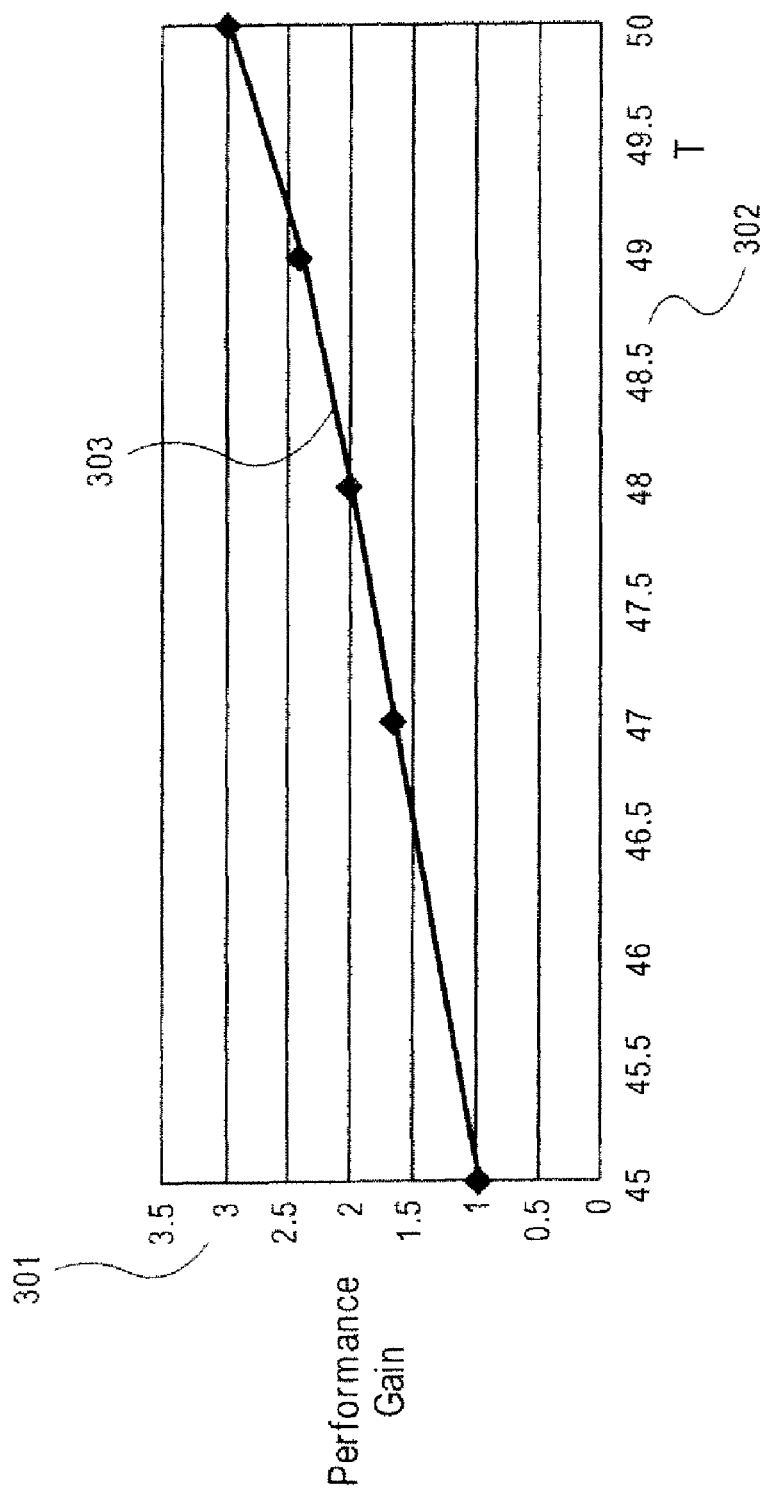
FIG. 3 shows one embodiment of a graph illustrating a rough performance gain versus a critical temperature threshold for a data processing system.

FIG. 3 shows one embodiment of a graph 300 illustrating a rough performance gain 301 versus a critical temperature threshold 302 for a data processing system. As shown in FIG. 3, a performance gain 303 increases when a critical temperature threshold 302 increases. As shown in FIG. 3, the value of the critical threshold for a data processing system needs to be chosen carefully as it can significantly affect the performance of the data processing system. That is, a significant temperature-performance tradeoff is involved.

For example, as shown in FIG. 3, a critical temperature threshold of 45 C may provide the lower temperature (better cooling experience and user satisfaction) while providing a lower performance, and the critical temperature threshold of 50 C may provide the higher performance while providing the higher temperature (worse cooling experience and worse user satisfaction). Generally, a compromise is made and a fixed temperature threshold in the middle, like 47 C, may be chosen. In a real world, however, a user may want a cooler machine (45 C), for example, when the data processing system (e.g., a laptop computer) is at one location (e.g., on a user's lap).

A user may want a better performance (49 C-50 C) of a data processing system (e.g., a laptop computer), for example, when the system is at another location (e.g., on a desk). As shown in FIG. 3, for every degree of restriction on an external temperature of the system (critical temperature threshold), there may be a significant impact on the performance. A desired thermal requirement for a data processing system may be entered by a user through a user interface (not shown). The user interface may include, for example, a 'temperature requirement scrollbar' or a check box allowing a user to set a thermal requirement. The check box may, for example, have options "set a first thermal requirement if the laptop will not be at a first location", "set a second thermal requirement if the laptop will be at the first location" and/or "set a third thermal requirement if the lid of the laptop is not closed", and the like. The thermal requirement of the data processing system may be adjusted based on the entered thermal requirement. In one embodiment, a thermal requirement for a data processing system is predicted and dynamically adjusted based on a user's behavior or action to provide an optimal performance-user satisfaction trade-off, as set forth in further detail below.

Figure 4A:
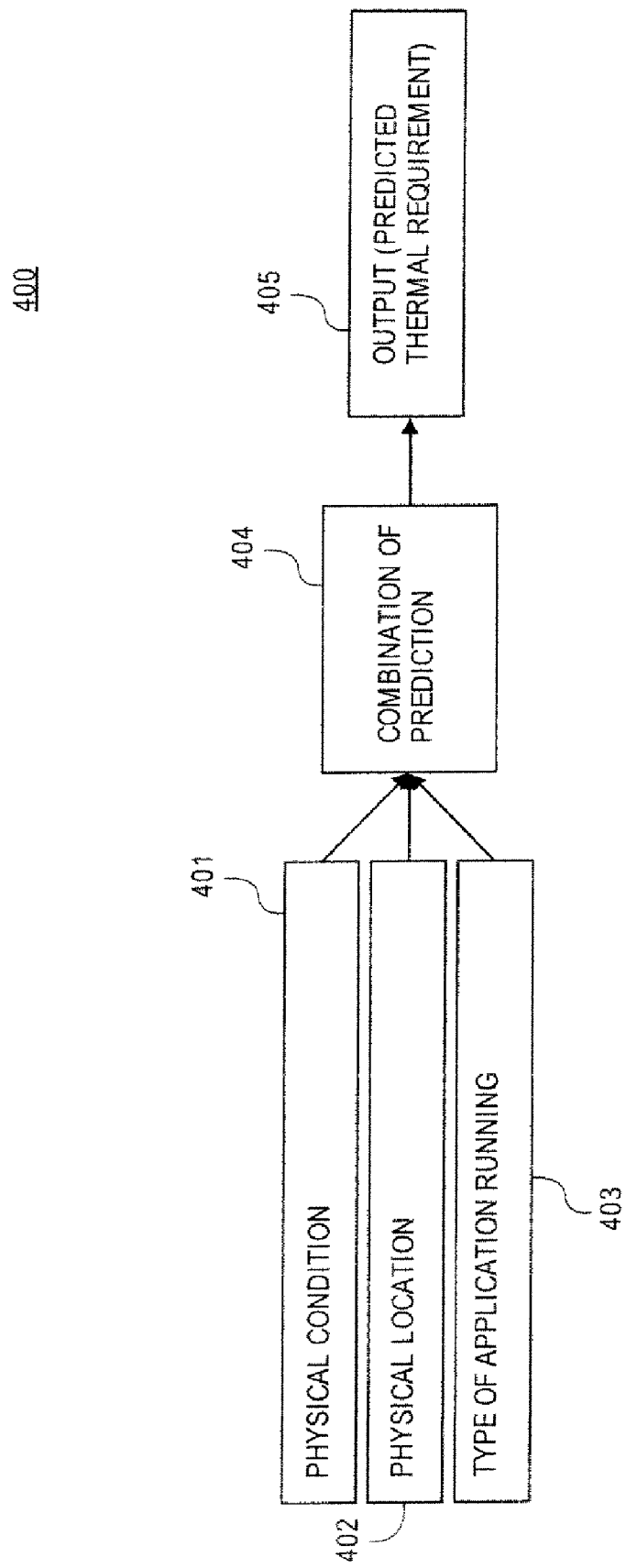
FIG. 4A shows one embodiment a block diagram to predict a thermal requirement for a data processing system based on one or more conditions.

FIG. 4A shows one embodiment a block diagram to predict a thermal requirement for a data processing system based on one or more conditions. As shown in FIG. 4A, a condition associated with a data processing system may be a physical condition of the data processing system 401, a location of the data processing system 402, a type of application operating on the data processing system, and/or a quantity of applications operating on the data processing system (not shown).

In one embodiment, detecting physical condition 401 involves determining a position of one portion of a data processing system (e.g., a lid) relative another portion of the data processing system (e.g., a bottom portion). In another embodiment, detecting physical condition 401 involves determining a state of a peripheral device, e.g., determining whether a peripheral device, such as a keyboard, display, mouse, etc., is connected to the data processing system. In one embodiment, a thermal requirement for the data processing system for a subsequent time is predicted based on the detected physical condition 401. For example, a higher thermal requirement (e.g., a higher critical external temperature set point) can be predicted if the laptop's lid is closed, and/or a peripheral device is connected, and a lower thermal requirement (e.g., a lower critical external temperature set point) is predicted if the laptop's lid is opened, and/or a peripheral device is not connected.

In one embodiment, detecting location 402 may include measuring a motion associated with the data processing system; and determining a location (e.g., on a user's lap or a desk) of the data processing system based on the motion. In one embodiment, a thermal requirement for the data processing system for a subsequent time is predicted based on the detected physical location of the data processing system 402. In one embodiment, it is determined whether a laptop is on a user's lap or on a desk. In one embodiment, a lower thermal requirement (e.g., a lower critical external temperature set point) is predicted if the laptop is on a user's lap, and higher thermal requirement (e.g., a higher critical external temperature set point) is predicted if the laptop is on a desk.

Detecting a type of application 403 may involve, for example, detecting whether an application requiring a lot of power (e.g, a 1080 p High Definition movie) is running on the data processing system. In one embodiment, a thermal requirement for the data processing system for a subsequent time is predicted based on the detected type of application running on the data processing system 403. In one embodiment, a higher thermal requirement (e.g., a higher critical external temperature set point) is predicted if the high definition movie application is operating on the data processing system, and a lower thermal requirement (e.g., a lower critical external temperature set point) is predicted if a word processor application is operating on the data processing system. In one embodiment, the predictions determined based on each of the detected conditions are weighed. As shown in FIG. 4A, an output 405 including a thermal requirement for the data processing system is predicted based on a combination of the weighted predictions 404.

Figure 11:
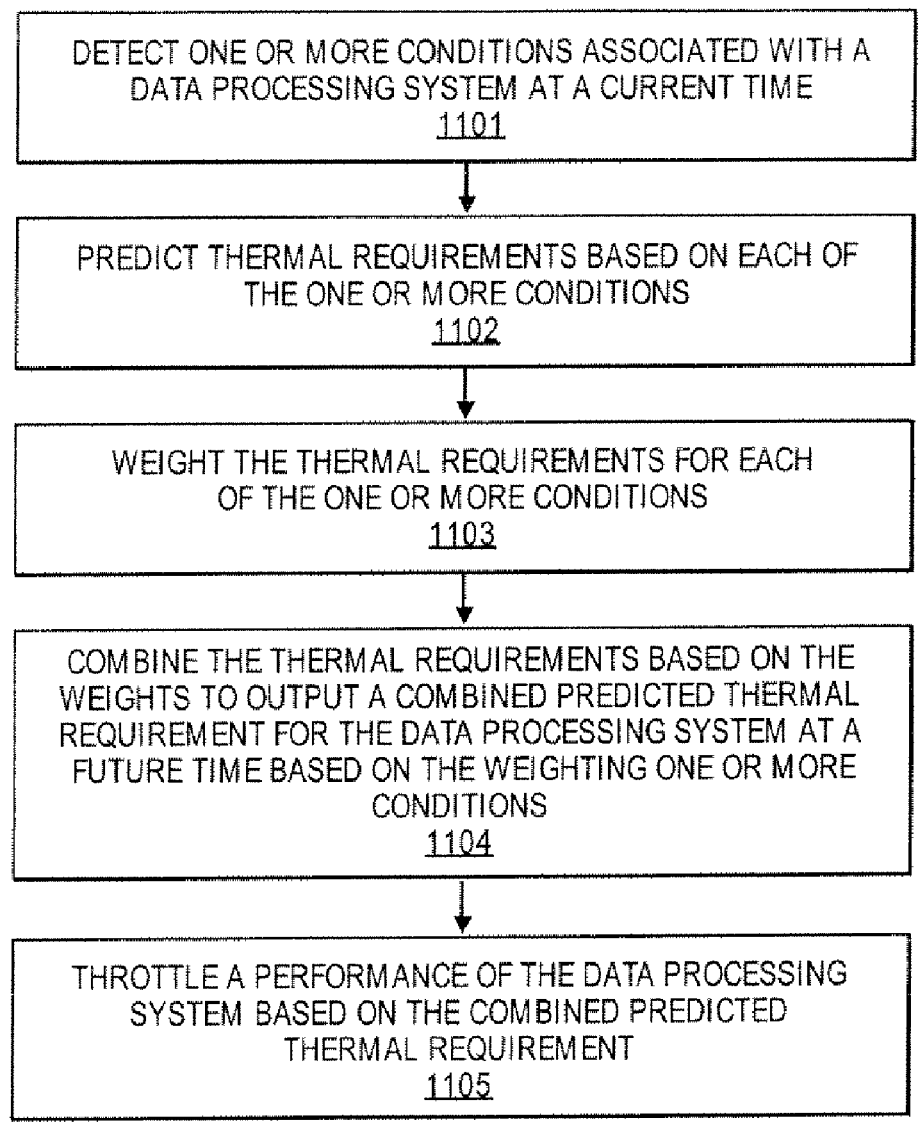
FIG. 11 is a flowchart of one embodiment of a method to automatically predict a thermal requirement of a data processing system.

FIG. 11 is a flowchart of one embodiment of a method to automatically predict a thermal requirement of a data processing system. Method 1100 begins with operation 1101 that involves detecting one or more conditions associated with a data processing system at a current time. Method 1100 continues with an optional operation 1102 involving predicting thermal requirements for the data processing system based on each of the one or more conditions. In one embodiment, predicting the temperature requirement includes selecting a critical external temperature set point (critical temperature threshold) for the data processing system corresponding to the detected one or more conditions from a look up table stored in a memory.

Figure 4B:
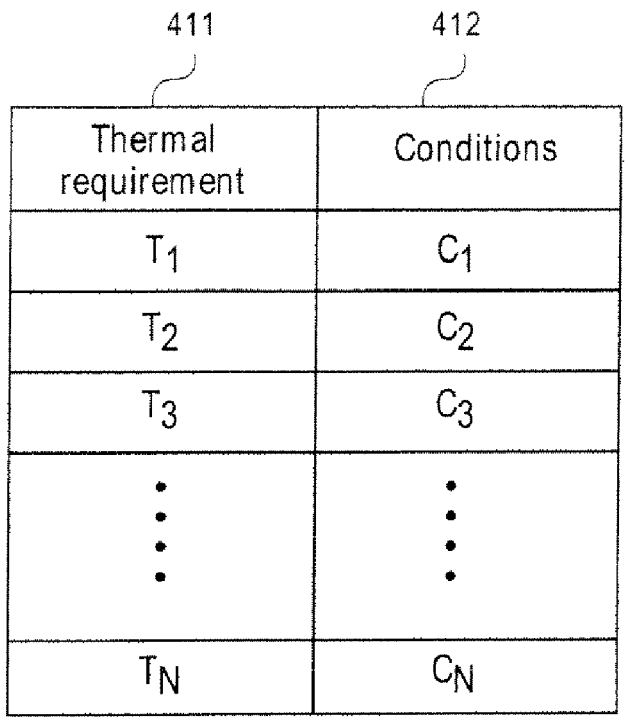
FIG. 4B shows one embodiment of a look-up table to select thermal requirements for various conditions.

FIG. 4B shows one embodiment of a look-up table to select thermal requirements for various conditions. Typically, the critical temperature targets for safety and customer satisfaction can be estimated during a product development stage. Usually, customer satisfaction temperature targets for the data processing system are significantly lower than the safety temperature targets for the data processing system.

As shown in FIG. 4B, look-up table 410 includes thermal requirements (e.g., critical external temperature set points T1-TN) corresponding to different conditions 412 C1-CN (e.g., conditions 401-403). Look-up table 410 can be stored in a memory of the data processing system. Thermal requirements T1-TN can be selected from table 410 for each of the detected conditions 412.

Referring back to FIG. 11, at operation 1103 the predicted thermal requirements for each of the one or more conditions are weighted. In one embodiment, more weight is given to the physical condition 401 than to the location 402 and type of application 403. In another embodiment, more weight is given to the physical condition 401 and to the type of application 403 than to the location 402. In yet another embodiment, more weight is given to the location 402 than to the physical condition 401 and type of application 403. At operation 1103 the weighted predicted thermal requirements for each of the one or more conditions are combined to output a predicted combined thermal requirement for the data processing system.

Method continues with operation 1104 that involves throttling a performance of the data processing system based on the predicted combined thermal requirement to maintain an external data processing system temperature below the combined temperature requirement. In one embodiment, throttling the performance involves adjusting operating voltage and/or frequency of the data processing system based on the predicted combined thermal requirement. In one embodiment, an operating voltage and/or frequency of the data processing system is adjusted by selecting an operating voltage and/or operating frequency from a look up table stored in a memory according to the predicted combined thermal requirement.

Figure 4C:
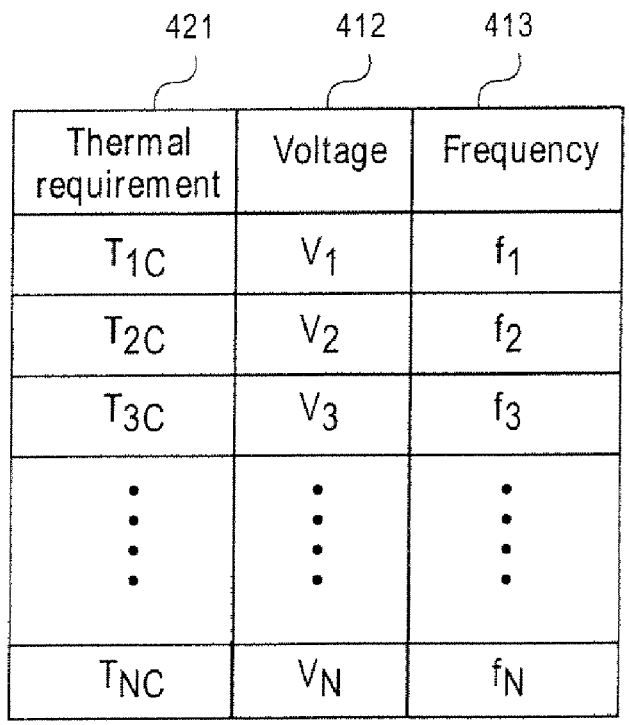
FIG. 4C shows one embodiment of a look-up table to select a performance setting for the data processing system according to various thermal requirements.

FIG. 4C shows one embodiment of a look-up table to select a performance setting (e.g., operating voltage and/or frequency) for the data processing system according to various thermal requirements. Look-up table 420 includes performance settings 422 and 413 (e.g., voltages V1-VN and frequencies f1-fN) for the data processing system that correspond to the thermal requirements 421 (e.g., combined thermal requirements T1c-TNc).

Figure 12:
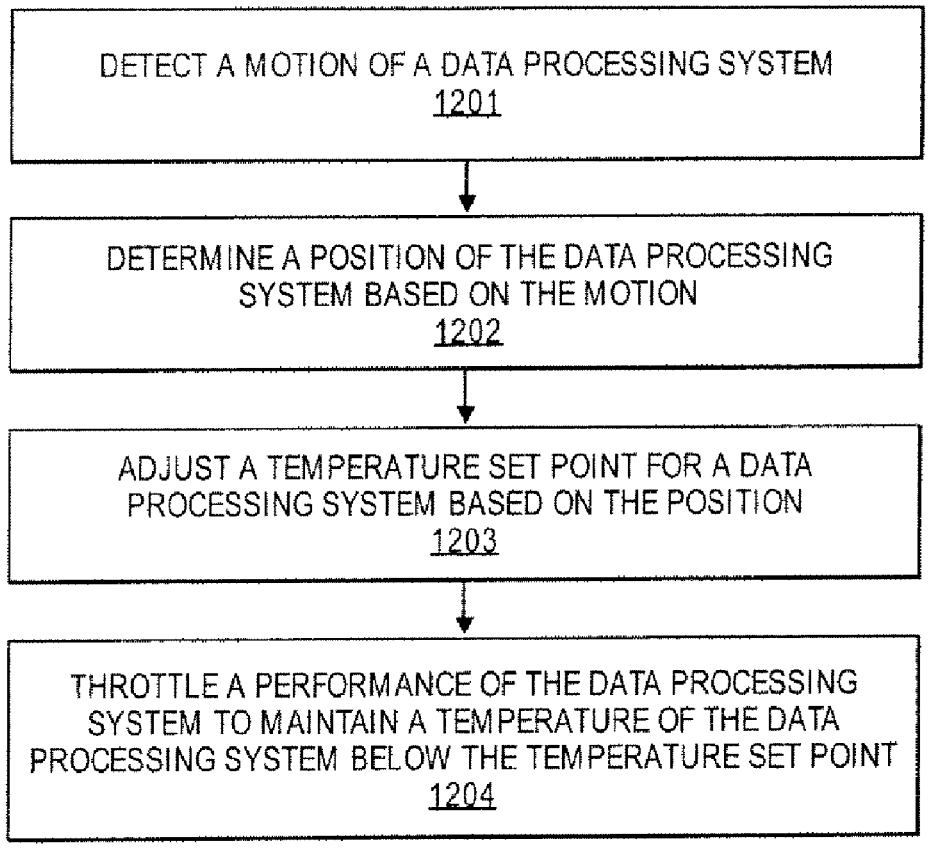
FIG. 12 is a flowchart of one embodiment of a method to adjust a thermal requirement of a data processing system based on a location.

FIG. 12 is a flowchart of one embodiment of a method to adjust a thermal requirement of a data processing system based on a location. Method 1200 begins with operation 1201 involving detecting a motion of a data processing system, as set forth in further detail below. In one embodiment, detecting the motion of the data processing system includes measuring accelerations associated with the data processing system. At operation 1202 a position of the data processing system is determined based on the detected motion, as set forth in further detail below. A temperature set point (e.g., external critical temperature set point) for the data processing system is adjusted based on the determined position at operation 1203, as set forth in further detail below. A performance of the data processing system is throttled to maintain a data processing system temperature below the adjusted temperature set point at operation 1209.

Figure 5:
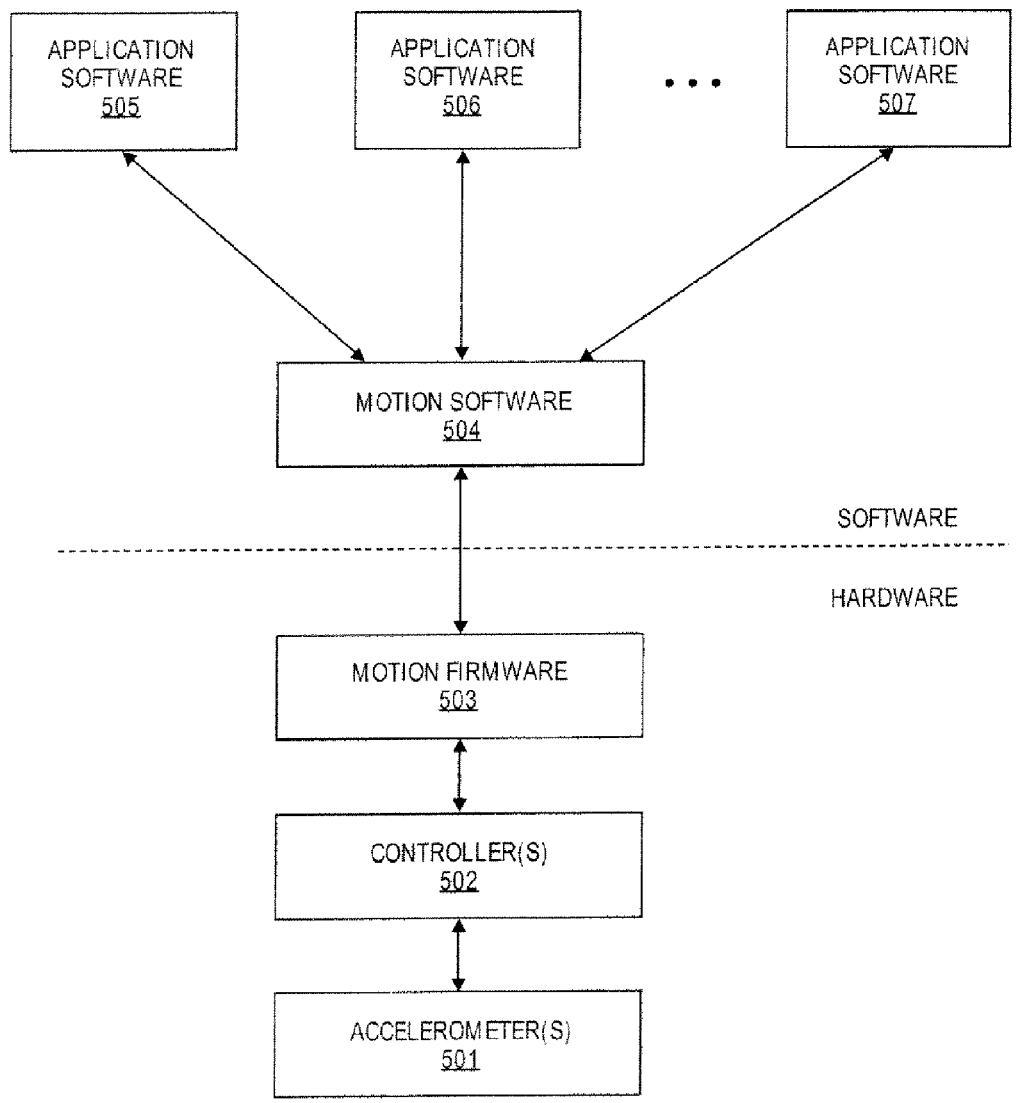
FIG. 5 is a block diagram illustrating an exemplary architecture of a portable data processing system according to one embodiment of the invention.

FIG. 5 is a block diagram illustrating an exemplary architecture of a portable data processing system (e.g., a laptop computer) according to one embodiment of the invention. In one embodiment, the exemplary system 500 includes, but is not limited to, a processor, a memory coupled to the processor, the memory having instructions stored therein, and an accelerometer coupled to the processor and the memory to detect movement of the portable device, where the processor executes instructions from the memory to perform one or more predetermined user configurable actions in response to the detection of the movement of the portable device. In an alternative embodiment, the exemplary system 500 further includes a controller coupled to the accelerometer to determine a direction of the movement based on movement data provided by the accelerometer and to compare the determined direction of the movement with a predetermined direction to determine whether the determined direction relatively matches the predetermined direction in order to execute the instructions.

Referring to FIG. 5, according to one embodiment, exemplary system 500 includes one or more accelerometers 501, one or more controllers 502 coupled to the accelerometers 501, a motion related firmware 503, motion software component 504, and one or more application software 505-507. The accelerometer 501 may be attached to the portable device, such as, for example, a motherboard of the portable device. Alternatively, the accelerometer 501 may be integrated with another component of the portable device. For example, the accelerometer 501 may be integrated with a chipset of the portable device.

According to one embodiment, the accelerometer 501 is able to detect a movement including an acceleration and/or de-acceleration of the portable device. In one embodiment, the accelerometer 501 is always turned on to measure a motion of the data processing system even when the memory disk is not spinning. The accelerometer 501 may generate movement data for multiple dimensions, which may be used to determine a moving direction of the portable device. For example, the accelerometer 501 may generate X, Y, and Z axis acceleration information when the accelerometer 501 detects that the portable device is moved. In one embodiment, the accelerometer 501 may be implemented as those described in U.S. Pat. No. 6,520,013, which is assigned to a common assignee of the present application. Alternatively, the accelerometer 501 may be implemented using a variety of accelerometers commercially available. For example, the accelerometer 501 may be a KGF01 accelerometer from Kionix or an ADXL311 accelerometer from Analog Devices.

In addition, the exemplary system 500 includes one or more controllers 502 coupled to the accelerometer(s) 501. The controller 502 may be used to calculate a moving direction, also referred to as moving vector, of the portable device. The moving vector may be determined according to one or more predetermined formulas based on the movement data (e.g., X, Y, and Z axis moving information) provided by the accelerometer 501, as described in details in U.S. patent application Ser. No. 10/986,730 filed Nov. 12, 2004, which is incorporated by reference herein in its entirety.

According to one embodiment, the controller 502 is responsible for monitoring one or more outputs of the accelerometer 501 and communicating with other components, such as, for example, a chipset (e.g., a memory controller or a north bridge) and/or a microprocessor (e.g., a CPU), of the portable device. The controller 502 may be implemented using a variety of microcontrollers commercially available. For example, controller 502 may be a PIC 16F818 microcontroller from Microchip. Controller 502 may be integrated with the accelerometer 501. Alternatively, controller 502 may be integrated with other components, such as, for example, a chipset or a microprocessor, of the portable device.

In one embodiment, the controller 502 may communicate with other components via a bus, such as, for example, an I2C (inter-IC) bus, and an interrupt line. In response to the movement data, the controller 502 generates an interrupt, for example, a hardware interrupt, a software interrupt, or a combination of both, via an interrupt line to other components, such as, firmware 503, to notify them of such a movement. In addition, the controller 502 may further calculate a moving vector based on the movement data provided by the accelerometer 501, as described in U.S. patent application Ser. No. 10/986,730.

Referring back to FIG. 5, motion firmware 503 includes one or more pieces of machine executable code, which may be embedded within one or more hardware components, such as, for example, controller 502 or a chipset (e.g., a part of BIOS, also referred to as basic input/output system), of the portable device. In one embodiment, motion firmware 503 may be stored in a read-only memory (ROM) (e.g., a flash memory) of controller 502. However, the machine executable code of motion firmware 503 may be upgraded by uploading a newer version into the memory, for example, using a flash utility. The firmware 503 may be responsible for detecting any events that are generated in response to the movement detection. According to one embodiment, the firmware 503 provides a primary communications mechanism between controller 502 and other components, such as, for example, an operating system (OS), of the portable device.

Motion software 504 may be responsible for communicating between the motion firmware 503 and the rest of software components, such as application software components 505-507, as well as the operating system. In one embodiment, the motion software 504 may be implemented as a part of an operating system, such as, for example, a kernel component or a device driver, etc. The operating system may be implemented using a variety of operating systems commercially available. For example, the operating system may be a Mac OS from Apple Computer. Alternatively, the operating system may be a Windows operating system from Microsoft. Other operating systems, such as, for example, a Unix, a Linux, an embedded operating system (e.g., a Palm OS), or a real-time operating system, may also be implemented.

According to one embodiment, in response to the motion detection event, which may be notified by the motion firmware 503, the motion software component 504 may communicate the event to one or more application software 505-507. The applications 505-507 may be a variety of different applications, such as, for example, an application to automatically adjust a thermal requirement of a data processing system based on the detected motion, a browser, a word processor, a slide presentation, etc. In one embodiment, an accelerometer is used for protecting a disk drive from sudden accelerations and for automatic adjustment of a thermal requirement of a data processing system.

Figure 6A:
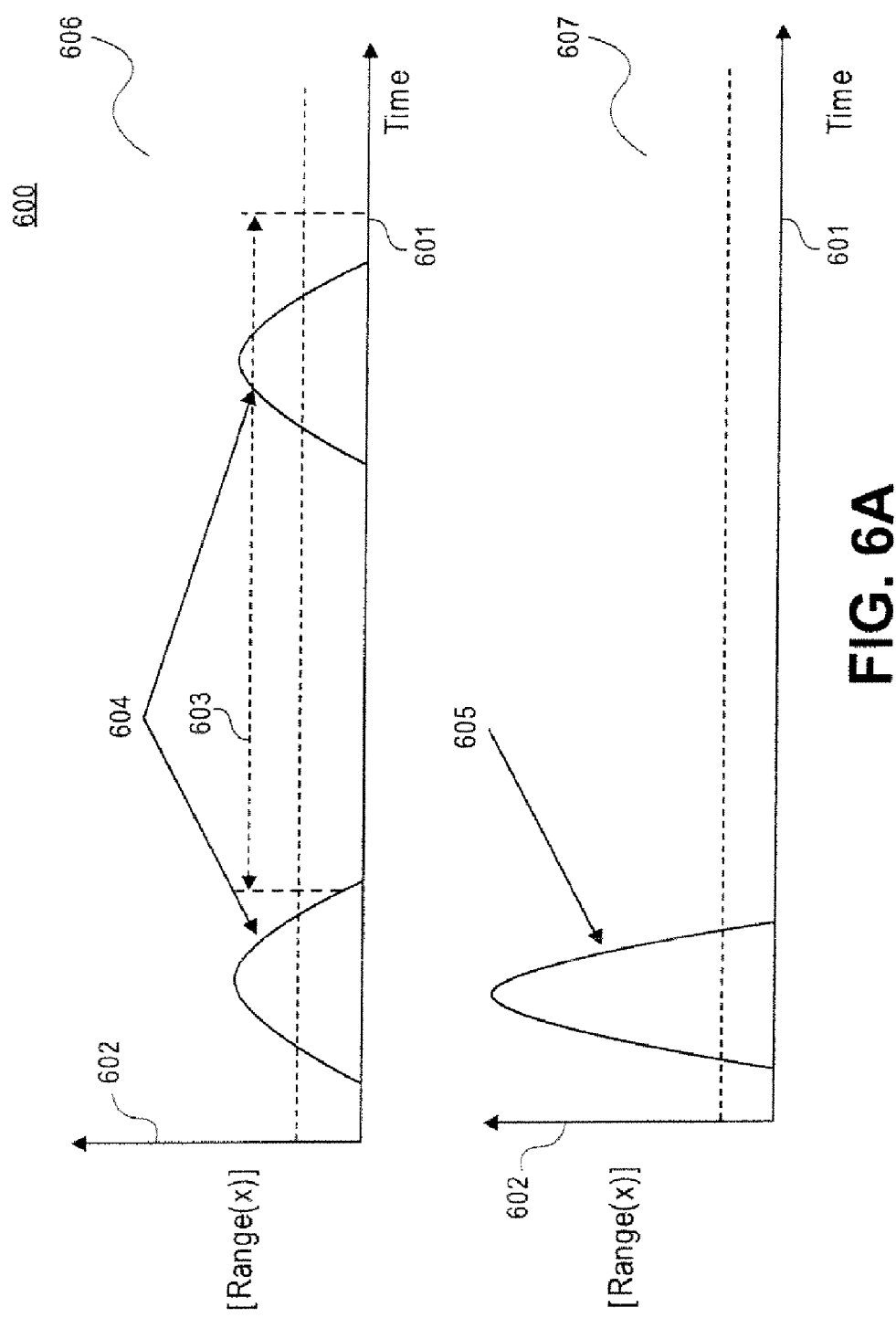
FIG. 6A illustrates one embodiment of signatures of motions at different locations of a data processing system.

FIG. 6A illustrates one embodiment of signatures of motions at different locations of a data processing system. These motions can be captured by a motion sensor, e.g., an accelerometer, as described above. As shown in FIG. 6A, a graph 606 of a range of motion 602 versus interarrival time 601 showing a signature of the motion generated when a data processing system is at one location (e.g., a laptop on a user's lap) is significantly different from a graph 606 of a range of motion 602 versus interarrival time 601 showing a signature of the motion 607 that is generated when a data processing system is at another location (e.g., when a desk, or the laptop upon it, is hit). Signature of motion 604 has small but frequent disturbances 604, whereas signature of motion 607 has a single large disturbance 605. That is, disturbances 604 have smaller range of motion 602 than disturbance 605. As shown in FIG. 6A, at least one disturbance 604 occurs during a time 603 (e.g., a human stability period).

The small and frequent disturbances 604 are caused typically by an unstable support when a laptop is on a user's lap and an involuntary motion of user's muscles. The unstable support typically generates small disturbances, e.g., when the user interacts with a computer through an input device, e.g., a keyboard, touchpad, etc. The frequency of these disturbances depends on the type of work that the user is currently doing. For example, the frequency will be higher when the user is typing a document and will be lower when the user is watching a movie.

The involuntary motion of muscles can occur because users typically cannot stay in the same posture for a long period of time. Typically, users constantly move their body, for example by moving legs, changing sitting posture, swiveling on a chair, moving the laptop from one portion of the lap to another, etc. The involuntary motion of user's muscles small disturbances that are captured by motion sensor. The frequency of these disturbances may vary from one user to another and may depend on a level of satisfaction that the user has with the current posture.

That is, when the laptop is on a user's lap, it is highly probable that at least one small disturbance within a certain time (e.g., a human stability period $T_{hs}$) is detected. In one embodiment, the value of $T_{hs}$ is determined empirically, such that a probability that a disturbance is generated within time $T_{hs}$, when the laptop is on a user's lap is very high (e.g., more than 90%):

$$P(\text{a disturbance is generated within time } T_{hs}/\text{laptop is on a user's lap}) \text{ is high} \quad (1)$$

and a probability that a disturbance is generated within time $T_{hs}$ when the laptop is on the desk is very low (e.g., less than 90%):

$$P(\text{a disturbance is generated within time } T_{hs}/\text{laptop is on a desk}) \text{ is low} \quad (2).$$

A human stability period ($T_{hs}$) can be visualized by modeling the arrival process of the disturbances using a Poisson random variable. When the laptop is on a user's lap, the arrival rate of the disturbances ($\lambda_{lap}$) is significantly greater than the arrival rate when the laptop is on a desk ($\lambda_{desk}$), such that $\lambda_{lap} > \lambda_{desk}$. The inter-arrival time thus follows exponential distribution with a mean $1/\lambda_{lap}$ in case of a user's lap, and mean $1/\lambda_{desk}$ in case of a desk.

Figure 7:
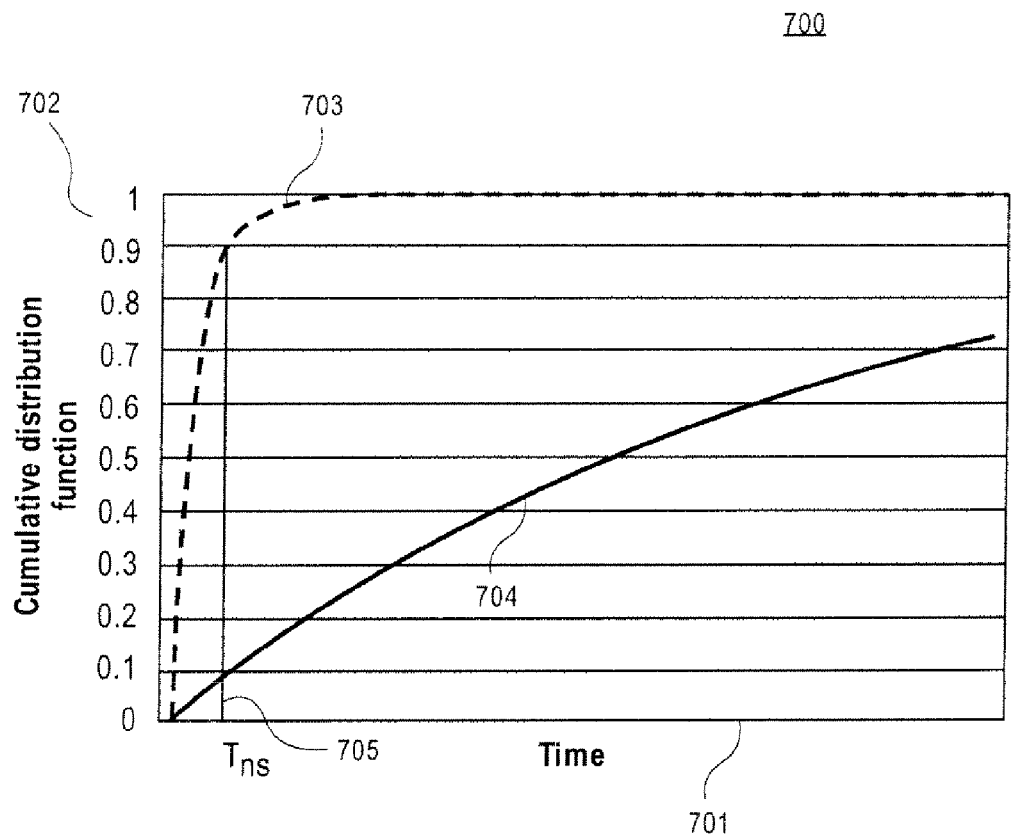
FIG. 7 shows one embodiment of a cumulative distribution function ("CDF") of interarrival time of disturbances when a data processing system is located at different locations.

FIG. 7 shows one embodiment of a cumulative distribution function ("CDF") of interarrival time of disturbances when a data processing system (e.g., a laptop) is located at different locations. As shown in FIG. 7, the CDF 702 versus interarrival time 701 (e.g., time between the disturbances, entropy interval time) dependence for one location of a data processing system 703 is different from the CDF of disturbances versus time dependence for another location of the data processing system 704. The arrival process of disturbances follows Poisson distribution such that the arrival rate of disturbances when the data processing system is at one location 703 (e.g., λlap) is greater than the arrival rate of disturbances when the data processing system is at another location 704 (e.g., λdesk). A conceptual location of a human stability period T hs 705 on the CDF plots of inter-arrival time of disturbances is shown in FIG. 7.

Using Bayesian Inference on (1) & (2) set forth above, the likelihood that the laptop is on a user's lap, given that no disturbance is detected within time Ths, is low:

$$L(\text{laptop is on a user's lap/no disturbance is detected within time Ths}) \text{ is low} \qquad (3).$$

The above Bayesian inference forms the basis of the predicting the thermal requirement for the data processing system based on a location.

Figure 13:
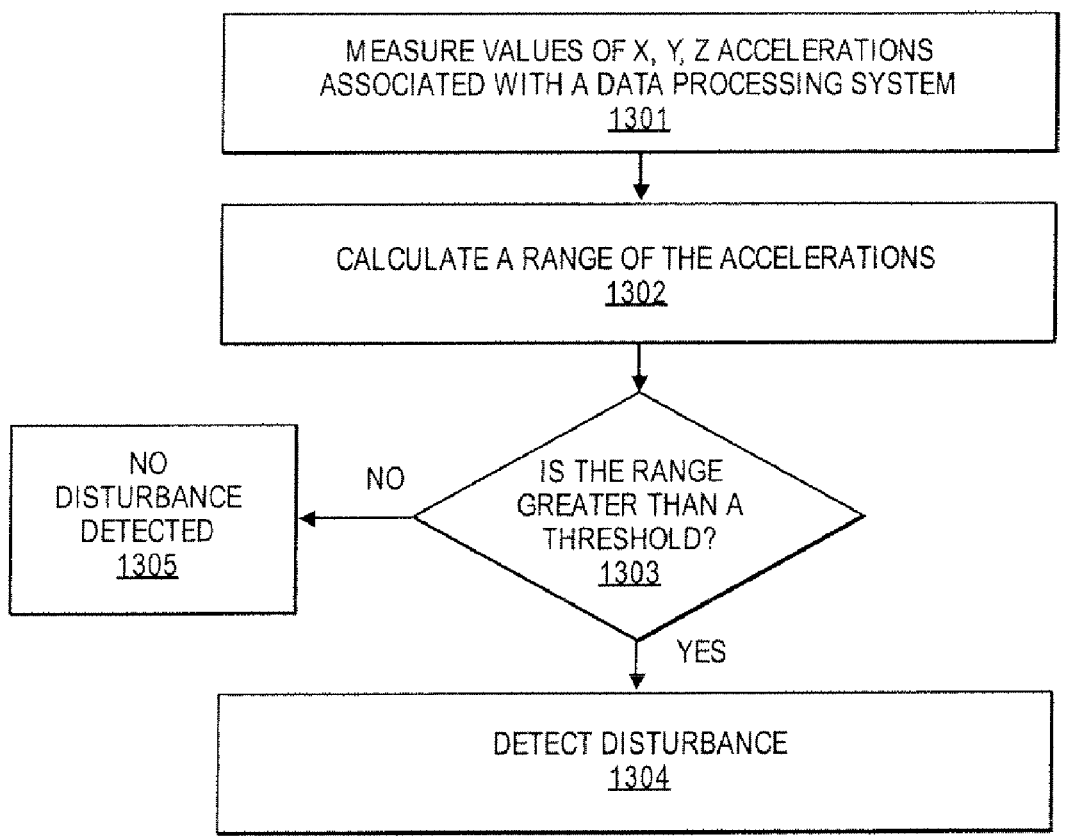
FIG. 13 is a flowchart of one embodiment of a method to detect a disturbance associated with a motion.

FIG. 13 is a flowchart of one embodiment of a method to detect a disturbance associated with a motion. Method 1300 begins with operation 1301 that involves measuring values of accelerations along axes X, Y, Z (e.g, in Cartesian coordinates) at regular time intervals. At operation 1302 a range of the accelerations is calculated for every time interval (e.g., entropy time interval TEI). At operation 1303 it is determined whether a range of accelerations is greater than a predetermined threshold. In one embodiment, the threshold is determined empirically. If the range of accelerations is greater than the predetermined threshold, a disturbance associated with a motion is detected at operation 1304. If the range of accelerations is not greater than the predetermined threshold, no disturbance is detected at operation 1305.

Figure 6B:
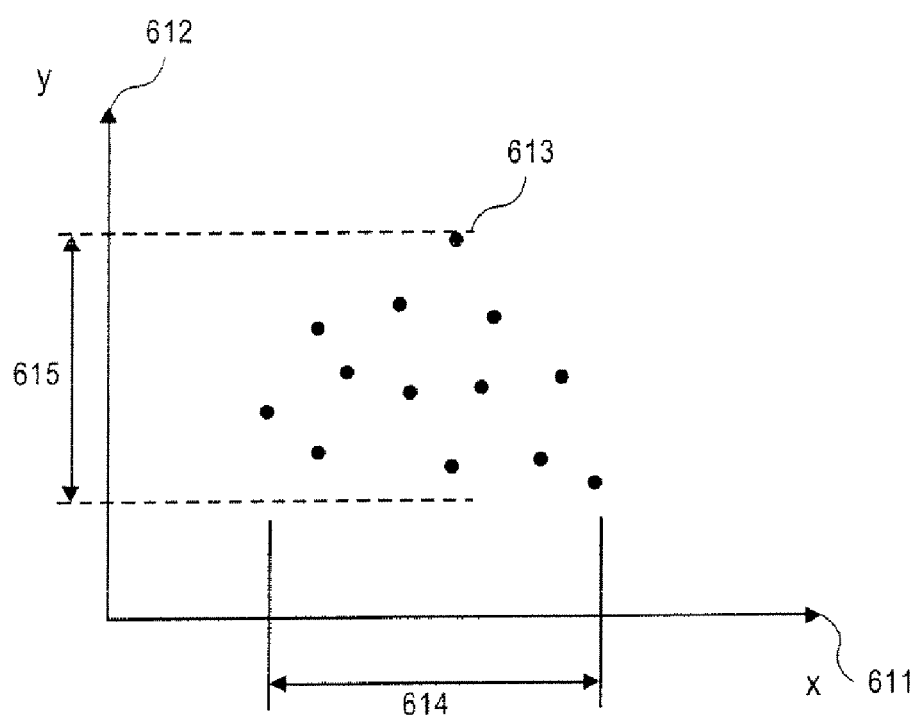
FIG. 6B illustrates one embodiment of determining a range of disturbances.

FIG. 6B illustrates one embodiment of determining a range of disturbances. As shown in FIG. 6B, X and Y acceleration values, such as an acceleration value 613, are measured. A range of X acceleration values 614 and a range of Y acceleration values 615 are determined. In one embodiment, calculating the range of accelerations instead of a mean value of accelerations provides more accurate determination of a location of a data processing system having slanting surfaces. In another embodiment, a mean value of accelerations is calculated to determine a location of a data processing system.

Figure 14:
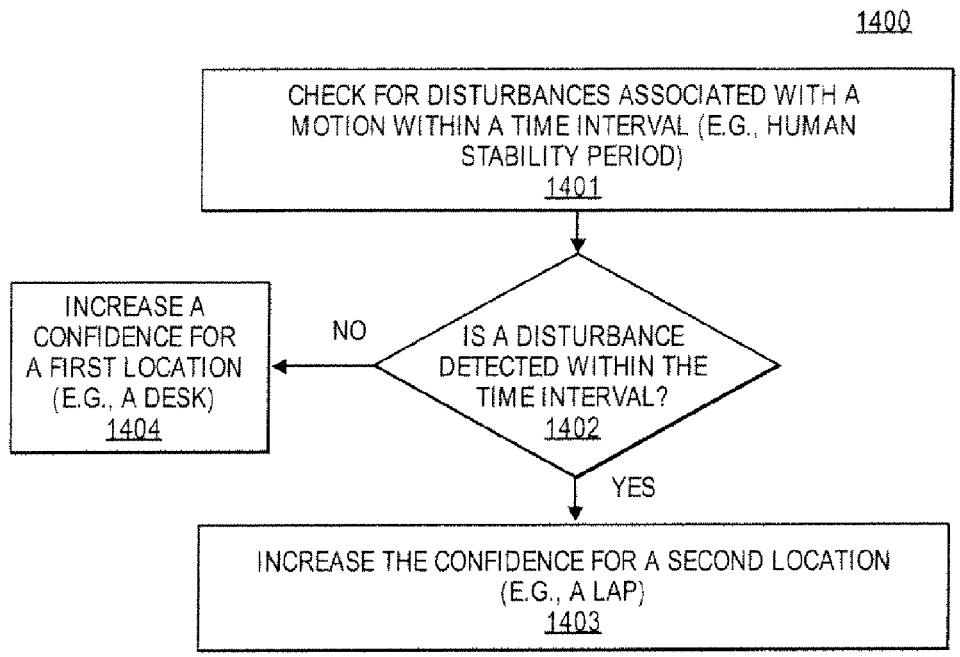
FIG. 14 is a flowchart of one embodiment of a method 1400 to determine a location of a data processing system.

FIG. 14 is a flowchart of one embodiment of a method 1400 to determine a location of a data processing system. As soon as a disturbance associated with a motion of a data processing system is detected, a disturbance is checked for a next time interval (e.g., Ths) at operation 1401. Method 1400 continues with operation 1402 that includes determining whether any further disturbance is detected during the next time interval. If the disturbance is detected during the next time interval, the likelihood that the data processing system is at a first location (e.g., on a desk) is low (e.g. less than a predetermined value), and the confidence that the data processing system is at a second location (e.g., on a user's lap) is increased at operation 1403. If no further disturbances is detected during the next time interval, a likelihood of the data processing system being at the second location (e.g., on a user's lap) is low (e.g., less than a predetermined value), and confidence that the data processing system is at a first location (e.g., a desk) is increased at operation 1404.

Figure 15:
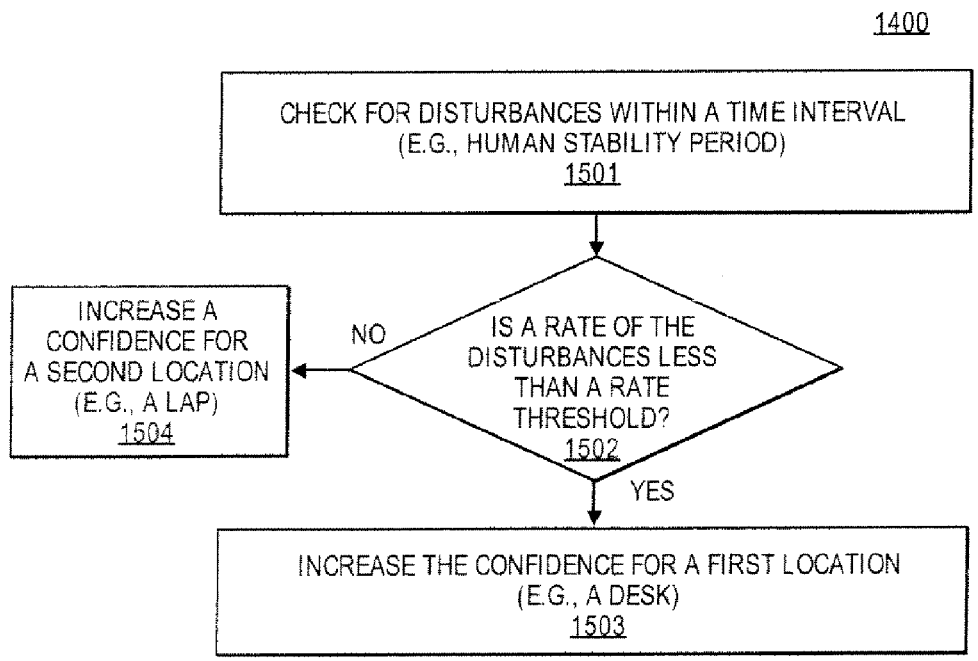
FIG. 15 is a flowchart of one embodiment of a method to determine a location of a data processing system based on a motion.

FIG. 15 is a flowchart of one embodiment of a method to determine a location of a data processing system based on a motion. Method 1500 begins with operation 1502 involving checking for disturbances within a time interval (e.g., Ths). At operation 1502 it is determined whether a rate of disturbances is less than a rate threshold. In one embodiment, the rate threshold is determined based on empirical data. If the rate of the disturbances is less than the rate threshold, the confidence that the data processing system is at a first location (e.g., a desk) is increased and the confidence that the data processing system is at a second location is decreased at operation 1503. If the rate of disturbances is more than the rate threshold, the confidence that the data processing system is at a second location (e.g., a user's lap) is increased and the confidence that a data processing system is at a first location is decreased at operation 1504.

One embodiment of an algorithm to determine a location (e.g., a desk or a lap) for a data processing system based on a disturbance is as follows:

1. For every $T_{EntropyInterval}$ of time, check if there is a disturbance
2. If there is a disturbance during $T_{EntropyInterval}$ of time,
    a. Check for a disturbance for a next time $T_{hs}$. This can be realized by resetting the stabilizing counter
    b. Decrease a desk confidence counter
3. if there is no disturbance
    a. If the stabilizing counter $<T_{hs}$, then prediction of being on lap remains. Increment the stabilizing counter, but do not increase the desk confidence counter
    b. If the stabilizing counter $>T_{hs}$, then increase the desk confidence counter by one.

If the desk confidence counter is greater than a certain threshold then the DeskCase (e.g., a desk location) is predicted, otherwise the LapCase (e.g., a lap location) is predicted. A small amount of hysteresis is incorporated into the algorithm to avoid jumping back and forth between Lap and Desk.

Figures 8, 9:
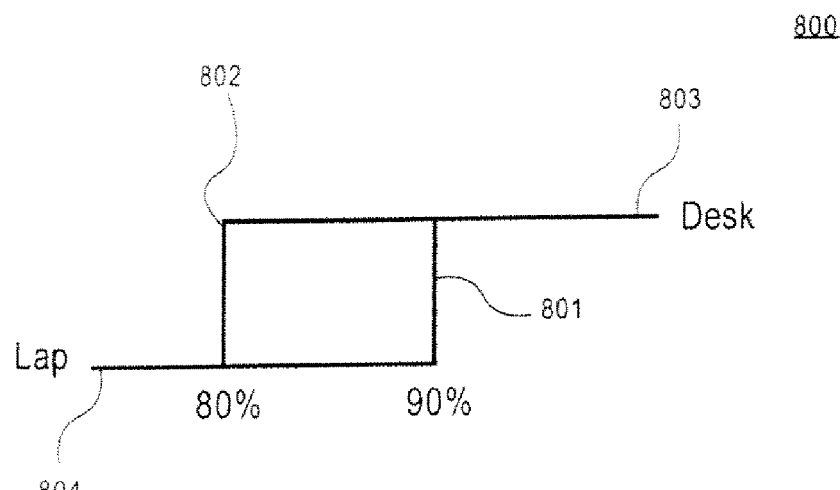
FIG. 8 shows a diagram of one embodiment of a predicting a location using a confidence counter.
FIG. 9 shows a table to determine a location of a data processing system according to one embodiment.

FIG. 8 shows a diagram of one embodiment of a predicting a location using a confidence counter. As shown in FIG. 8, if the desk confidence counter is greater than 90% the "Desk" is predicted. The "Lap" is predicted if the desk confidence counter is less than 80%. The current prediction of a location (e.g., desk or lap) is retained when the desk confidence counter is between 80% and 90%. The threshold for predicting Desk is generally maintained higher (e.g., 90%) in order to reduce the Type-I error (e.g., a False Positive error).

FIG. 9 shows a table 900 to determine a location of a data processing system according to one embodiment. Table 900 shows predicted values 903 ("Desk" 905 or "Lap" 904) versus True Conditions 901 ("Desk" 902 or "Lap"906). The Null hypothesis is that the laptop is on Lap, and false positives need to be minimized, as shown in FIG. 9.

The Type-I error can be further reduced due to the self-correcting behavior introduced unconsciously by the user. For example, the "Desk" is predicted when the laptop is actually on a lap. This may allow the notebook to get hotter. If the temperature goes beyond the user's comfortable point, the user may feel the increase in the temperature and may start fidgeting. This can generate small disturbances that in turn can decrease the value of desk confidence counter, thereby reducing the probability of Type-I error.

Figure 16:
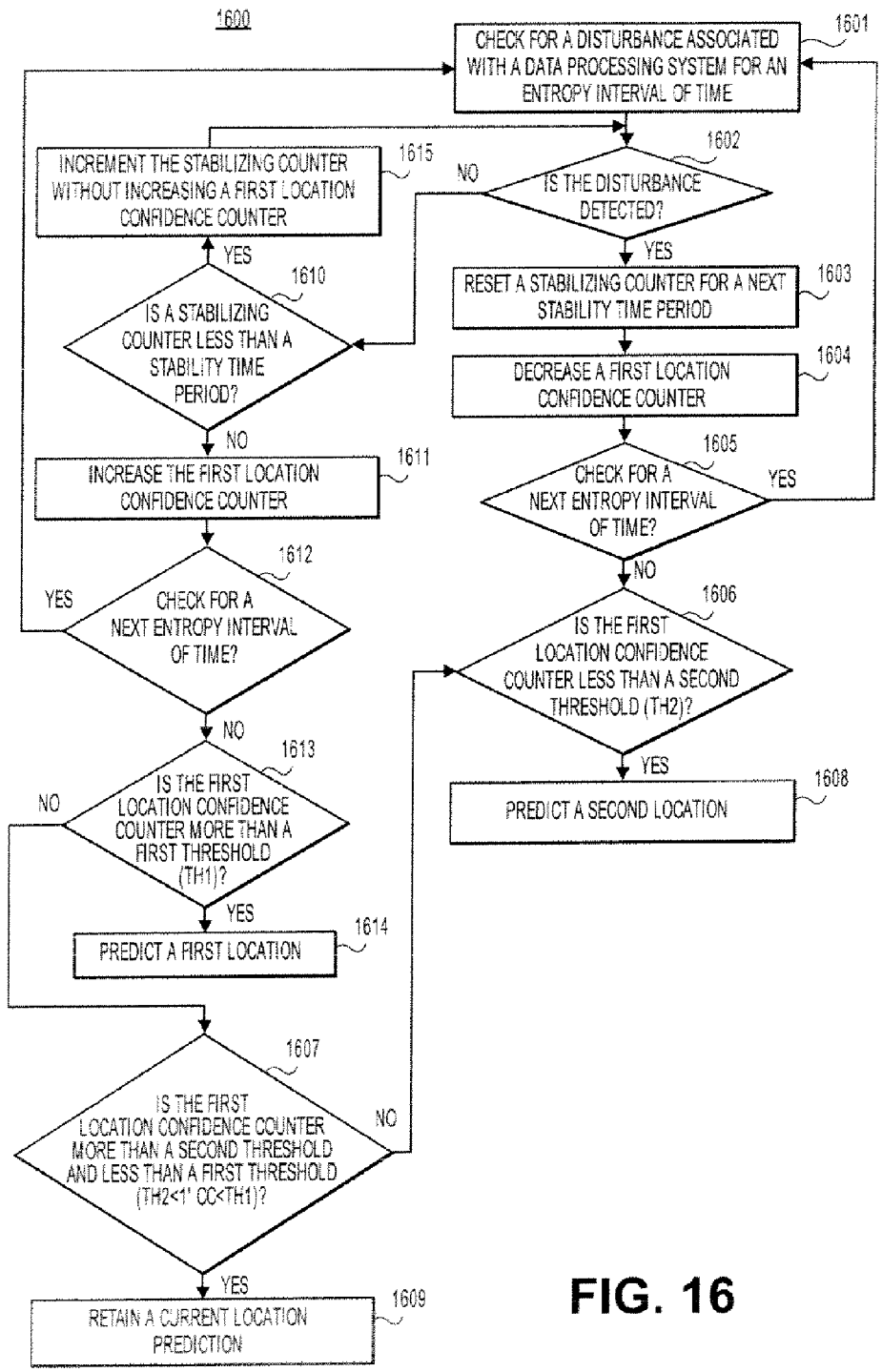
FIG. 16 is a flowchart of a method to determine a location of a data processing system based on a detected motion.

FIG. 16 is a flowchart of a method to determine a location of a data processing system based on a detected motion. Method 1600 begins with operation 1601 including checking for a disturbance associated with a motion of a data processing system for every time interval (e.g., an entropy interval of time, the time between the end of the disturbance and a possible start of a next disturbance). At operation 1602 it is determined whether a disturbance is detected. If the disturbance is detected, a next human stability time period (e.g., Ths) is checked for a disturbance. This can be realized by resetting the stabilizing counter. For example, if the disturbance is detected, method 1600 continues at operation 1603 that involves resetting a stabilizing counter for a next human stability time period. At operation 1604 a first location (e.g., a desk) confidence counter is decreased. At operation 1605 it is determined whether to check for a next time interval (e.g., an entropy interval of time, the time between the end of the disturbance and a possible start of a next disturbance) is needed.

If the check for the next time interval is needed, method 1600 continues with operation 1601 to check for the disturbance for the next time interval. If it is determined that the check is not needed, it is determined at operation 1606 whether a first location confidence counter is less than a threshold. If the first location confidence counter is less than a second threshold, a second location (e.g., a lap) is predicted at operation 1608. At operation 1610, if no disturbance is detected, it is determined whether a stabilizing counter is set to a lesser value than a human stability time period (e.g., Ths). If the stabilizing counter is set to a value that is less than the human stability time period, at operation 1615 the stabilizing counter is incremented without increasing a first location confidence counter.

If the stabilizing counter is set to a value that is not less than the stability time period, the first location (e.g., a desk) confidence counter is increased at operation 1611. Next, at operation 1612 it is determined whether to check for a next time interval. If the check for a next time interval is not needed, at operation 1613 it is determined whether the first location confidence counter more than a first threshold (TH1). If the first location confidence counter is more than a first threshold, at operation 1614 a first location (e.g., a desk) is predicted. If a check for a next time interval is needed, method continues at operation 1601.

If the first location confidence counter is not more than a first threshold (TH1), it is determined whether the first location confidence counter is more than a second threshold and less than a first threshold (TH1<1st CC<TH1). If it is determined that the first location confidence counter is more than a second threshold and less than a first threshold a current location prediction is retained at operation 1609. If it is determined that the first location confidence counter is not more "than a second threshold and less than a first threshold", method continues with operation 1606.

Figure 10:
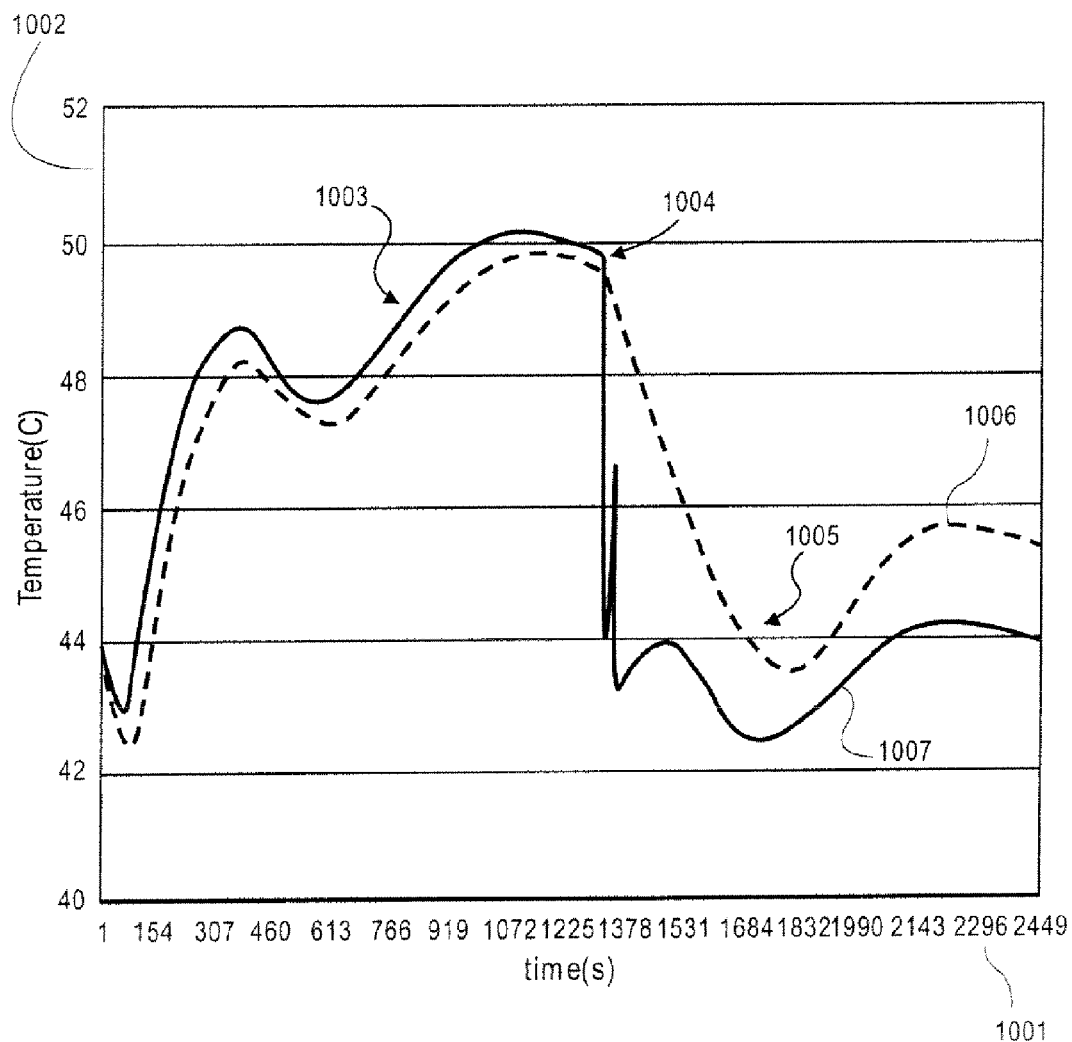
FIG. 10 shows a graph illustrating one embodiment of a dependence of a temperature 1002 of a data processing from time 1001 when the data processing system is moved from one location (e.g., a desk) to another location (e.g., a lap).

FIG. 10 shows a graph illustrating one embodiment of a dependence of a temperature 1002 of a data processing from time 1001 when the data processing system is moved from one location (e.g., a desk) to another location (e.g., a lap). Curve 1006 illustrates a synthetic (e.g., modeled) temperature behavior, and curve 1007 illustrates an actual (measured) temperature behavior when the data processing system is moved. As shown in FIG. 10, the temperature of the data processing system (e.g., a laptop) is higher on a desk 103 (49 C-50 C), and lower on a lap 1005 (45 C-46 C). As shown in FIG. 10, the temperature of the laptop drops 1004 during the transition when the system is moved from the desk to the lap. As shown in FIG. 10, the actual temperature 1007 drops more rapidly than the synthetic temperature 1006. This may be due to the contact of the laptop with cold ambient air, which may be around 22 C. As a result of adjusting the temperature requirement of the data processing system, as set described herein, the user does not feel the temperature of the data processing system (e.g., a laptop) greater than 45 C.

In the foregoing specification, embodiments of the invention have been described with reference to specific exemplary embodiments thereof. It will be evident that various modifications may be made thereto without departing from the broader spirit and scope of the invention. The specification and drawings are, accordingly, to be regarded in an illustrative sense rather than a restrictive sense.

What is claimed is:

1. A machine-implemented method, comprising:
   detecting a plurality of conditions associated with a data processing system; and
   determining a first temperature for the data processing system based on the plurality of conditions, the plurality of conditions including a state of motion of the data processing system and a state of a peripheral device that is coupled to the data processing system, wherein the first temperature is weighed based on the plurality of conditions.

2. The machine-implemented method of claim 1, wherein the detecting the plurality of conditions includes measuring a motion associated with the data processing system; and determining a location of the data processing system based on the motion.

3. The machine-implemented method of claim 1, wherein the detecting the plurality of conditions includes determining the state of the peripheral device.

4. The machine-implemented method of claim 1, wherein the detecting the plurality of conditions includes determining a position of one portion of the data processing system relative to another portion of the data processing system.

5. The machine-implemented method of claim 1, wherein the detecting the plurality of conditions includes determining a type of application operating on the data processing system.

6. The machine-implemented method of claim 1, further comprising
   predicting thermal requirements for each of the plurality of conditions; and
   weighing the predicted thermal requirements.

7. The machine-implemented method of claim 1, further comprising
   throttling a performance of the data processing system to maintain a data processing system temperature below the first temperature.

8. The machine-implemented method of claim 1, wherein the determining the first temperature includes selecting a temperature set point for the data processing system based on the plurality of conditions.

9. A non-transitory machine-readable medium storing executable program instructions which when executed by a data processing system causes the system to perform operations, comprising:
   detecting a plurality of conditions associated with a data processing system; and
   determining a first temperature for the data processing system based on the plurality of conditions, the plurality of conditions including a state of motion of the data processing system and a state of a peripheral device that is coupled to the data processing system, wherein the first temperature is weighed based on the plurality of conditions.

10. The non-transitory machine-readable medium of claim 9, wherein the detecting the plurality of conditions includes measuring a motion associated with the data processing system; and determining a location of the data processing system based on the motion.

11. The non-transitory machine-readable medium of claim 9, wherein the detecting the plurality of conditions includes determining the state of the peripheral device.

12. The non-transitory machine-readable medium of claim 9, wherein the detecting the plurality of conditions includes determining a position of one portion of the data processing system relative another portion of the data processing system.

13. The non-transitory machine-readable medium of claim 9, wherein the detecting the plurality of conditions includes determining a type of application operating on the data processing system.

14. The non-transitory machine-readable medium of claim 9, further comprising instructions that cause the system to perform operations comprising:

predicting thermal requirements for each of the plurality of conditions; and weighing the predicted thermal requirements.

15. The non-transitory machine-readable medium of claim 9, further comprising instructions that cause the system to perform operations comprising throttling a performance of the data processing system to maintain a data processing system temperature below the first temperature.

16. The non-transitory machine-readable medium of claim 9, wherein the determining the first temperature includes selecting a temperature set point for the data processing system based on the plurality of conditions.

17. A system, comprising:

a memory; and a processor coupled to the memory, wherein the processor is configured to detect a plurality of conditions associated with a data processing system; and to determine a first temperature for the data processing system based on the plurality of conditions, the plurality of conditions including a state of motion of the data processing system and a state of a peripheral device that is coupled to the data processing system, wherein the first temperature is weighed based on the plurality of conditions.

18. The system of claim 17, wherein the detecting the plurality of conditions includes measuring a motion associated with the data processing system;

and determining a location of the data processing system based on the motion.

19. The system of claim 17, wherein the detecting the plurality of conditions includes determining the state of the peripheral device.

20. The system of claim 17, wherein the detecting the plurality of conditions includes determining a position of one portion of the data processing system relative another portion of the data processing system.

21. The system of claim 17, wherein the detecting the plurality of conditions includes determining a type of application operating on the data processing system.

22. The system of claim 17, wherein the processor is further configured to predict thermal requirements for each of the plurality of conditions; and to weigh the predicted thermal requirements.

23. The system of claim 17, wherein the processor is further configured to throttle a performance of the data processing system to maintain a data processing system temperature below the first temperature.

24. The system of claim 17, wherein the determining the first temperature includes selecting a temperature set point for the data processing system based on the plurality of conditions.

25. A system, comprising:

means for detecting a plurality of conditions associated with a data processing system, the means for detecting comprising at least one processor; and means for determining a first temperature for the data processing system based on the plurality of conditions, the plurality of conditions including a state of motion of the data processing system and a state of a peripheral device that is coupled to the data processing system, wherein the first temperature is weighed based on the plurality of conditions.

26. The system of claim 25, wherein the means for detecting the plurality of conditions includes means for measuring a motion associated with the data processing system; and means for determining a location of the data processing system based on the motion.

* * * * *